United States Patent
Clarisse et al.

(10) Patent No.: US 7,496,189 B2
(45) Date of Patent: Feb. 24, 2009

(54) CALLER INFORMATION DISPLAY METHODS AND SYSTEMS

(75) Inventors: Olivier B. Clarisse, DesPlaines, IL (US); Pascal Collet, Oak Park, IL (US); Bruce Westergren, St. Charles, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 10/166,194

(22) Filed: Jun. 10, 2002

(65) Prior Publication Data

US 2003/0228010 A1    Dec. 11, 2003

(51) Int. Cl.
*H04M 3/42* (2006.01)
*H04M 1/64* (2006.01)
*H04M 1/56* (2006.01)
*H04M 15/06* (2006.01)

(52) U.S. Cl. .............. 379/207.15; 379/142.01; 379/142.08; 379/142.17

(58) Field of Classification Search ........... 379/142.01, 379/142.08, 142.02–142.07, 207.15, 76, 379/88.2, 215.01, 142.13, 88.19, 67.1, 201.4, 379/376.01, 142.17, 88.11; 455/412.2, 90.1, 455/466, 550.1; 370/352
See application file for complete search history.

(56) References Cited

U.S. PATENT DOCUMENTS

| | | | | |
|---|---|---|---|---|
| 5,796,806 A | * | 8/1998 | Birckbichler | 379/88.2 |
| 5,894,504 A | * | 4/1999 | Alfred et al. | 379/88.13 |
| 5,901,209 A | * | 5/1999 | Tannenbaum et al. | 379/142.09 |
| 6,028,921 A | * | 2/2000 | Malik et al. | 379/201.04 |
| 6,041,103 A | * | 3/2000 | La Porta et al. | 379/67.1 |
| 6,161,007 A | * | 12/2000 | McCutcheon et al. | 455/412.2 |
| 6,304,642 B1 | * | 10/2001 | Beamish et al. | 379/142.01 |
| 6,370,395 B1 | * | 4/2002 | Steen | 455/90.1 |
| 6,404,868 B1 | * | 6/2002 | Beamish et al. | 379/142.01 |
| 6,490,519 B1 | * | 12/2002 | Lapidot et al. | 701/117 |
| 6,574,486 B1 | * | 6/2003 | Labban | 455/550.1 |
| 6,680,935 B1 | * | 1/2004 | Kung et al. | 370/352 |
| 6,687,340 B1 | * | 2/2004 | Goldberg et al. | 379/88.14 |
| 6,707,895 B2 | * | 3/2004 | Reindle et al. | 379/142.13 |
| 6,741,689 B2 | * | 5/2004 | Burg | 379/201.01 |
| 6,760,413 B2 | * | 7/2004 | Cannon et al. | 379/88.19 |
| 6,778,655 B1 | * | 8/2004 | Veschi et al. | 379/215.01 |
| 6,868,155 B1 | * | 3/2005 | Cannon et al. | 379/376.01 |
| 2002/0085687 A1 | * | 7/2002 | Contractor et al. | 379/76 |
| 2003/0007616 A1 | * | 1/2003 | Alves et al. | 379/142.14 |
| 2003/0100320 A1 | * | 5/2003 | Ranjan | 455/466 |

(Continued)

*Primary Examiner*—Thjuan K Addy

(57) ABSTRACT

Methods and systems in a telecommunications network for dynamically providing calling party information to a called party from a calling party. A transfer of calling party information can be initiated from the calling party to the called party utilizing a caller identification mechanism in communication with one or more customer premise equipment devices associated with the telecommunications network. Thereafter, the calling party information can be dynamically displayed for the called party via the caller identification mechanism on a display screen of the customer premise equipment device, thereby permitting the called party to take action regarding the calling party information independent of prior or current telecommunications activities. The calling party information can be stored in a memory location for later retrieval by the called party if the called party does not immediately respond to the transfer of calling party information from the calling party to the called party. The calling party information can also be retrieved from the memory location of the customer premise equipment device, in response to a user input by the called party.

25 Claims, 6 Drawing Sheets

U.S. PATENT DOCUMENTS

2003/0219109 A1* 11/2003 Malik .................... 379/142.01
2004/0051700 A1* 3/2004 Pensjo ........................ 345/173
2004/0196966 A1* 10/2004 Bushnell .................. 379/88.19

* cited by examiner

CALLER INFORMATION DISPLAY METHODS AND SYSTEMS

TECHNICAL FIELD

The present invention is generally related to telecommunications networks. The present invention is also related telecommunications methods, systems, and devices thereof. The present invention is also related to customer premise equipment (CPE) devices utilized in telecommunications networks. The present invention is also related to packet-based telecommunications networks and IP telephony. Additionally, the present invention is related to Caller ID methods, systems and devices thereof. Finally, the present invention is related to display devices for the display of information for users of telecommunications networks.

BACKGROUND OF THE INVENTION

Recent advances and developments in packet networks, consumer premises equipment, network servers, and client software provide a synergistic environment for the development of new communication modes and complexities. Packet networks, including private intranets and the Internet, are becoming ubiquitous features of the public and private telecommunications infrastructures. Client premise equipment (CPE) includes such disparate device types as personal computers, cable modems, screen phones and personnel digital assistants, which singly and collectively enable a richer and more robust user interaction and interface via screens, input devices, and multimedia capabilities. Such CPE devices can also include telephones, facsimile (fax) machines, answering machines, paging devices, and the like, which have become an integral part of both business and domestic environments. While offering tremendous convenience and facilitating interpersonal contact and information exchange, these devices can also serve as a source of aggravation and annoyance.

A variety of caller identification, call screening and call blocking devices and/or services are offered or have been contemplated. Caller ID is a well-known service for caller identification, screening and/or blocking. Caller ID is a service provided by a telephone service provider that provides a user with information regarding an incoming call. Typically, a display associated with a user's telephone, either integrated into the telephone or as part of an adjunct box coupled to the telephone, will display the telephone number and/or name associated with an incoming call. In Type I Caller ID, which occurs when the user's telephone is generally in an on-hook state (i.e., the user is not already engaged in a telephone call while the incoming call is arriving), the Caller ID data is generally provided by a central office of the service provider as frequency shift keying (FSK) data between the first and second rings. The user, after the first ring, can thus look at the display to decide, based on the displayed information, whether to answer an incoming telephone call.

In Type II Caller ID, also known as Caller ID with Call Waiting (CID/CW), the user's telephone is in an off-hook state (i.e., already engaged in a telephone call while the incoming call is arriving). In addition to the familiar audible tone, known as a Subscriber Alert Signal ("SAS tone"), that alerts a user to an incoming call waiting telephone call, the central office provides a Caller ID Alert Signal ("CAS tone") to inform the user's telephone equipment that Caller ID data is about to be transmitted, pending receipt of an acknowledgment from the user's telephone equipment. Based on the CAS tone, the user's telephone briefly mutes its transducers (i.e., microphone and speaker) so that the FSK data is not heard by the user or corrupted by the user's speech. The muting period is sufficiently brief that it does not appreciably disrupt the voice communication between the parties to the conversation. The user, after hearing the SAS tone, can then view the display to determine whether to flash-hook over to the incoming call and temporarily place the existing call into a hold status.

The flash-hook operation (i.e., also known as a "flash line" operation) can be generally accomplished by briefly pressing or activating a switch-hook button, which can be normally in a first position, such as down, when the telephone is on-hook, and in a second position, such as up, when the telephone is off-hook, to alert the central office to the desire to switch to the incoming call. In general, when a telephone is equipped to receive Type II Caller ID data, a user who elects to flash-hook to an incoming call, based, for example, on viewing the Caller ID data associated with the incoming call, may subsequently decide to switch back to the original call and temporarily place the newer call in a hold status, and can do so by again activating the switch-hook. The user can switch back and forth between the two calls as often as desired.

Based on the foregoing, it can be appreciated that present CPE and Caller ID services provide fixed information based on the caller identity. Such devices, methods and systems thereof are limited, however, because they do not permit the dynamic transfer of information from a calling party to a called party. Such services do not offer real-time messaging capabilities in an effective manner to increase the accuracy and timeliness of critical information, particular in business environments. The present inventors have thus concluded that a need exists for an improved method and system, which will permit the dynamic transfer of information from calling parties to called parties.

BRIEF SUMMARY OF THE INVENTION

The following summary of the invention is provided to facilitate an understanding of some of the innovative features unique to the present invention and is not intended to be a full description. A full appreciation of the various aspects of the invention can be gained by taking the entire specification, claims, drawings and abstract as a whole.

It is therefore one aspect of the present invention to provide an improved telecommunications methods and systems.

It is yet another aspect of the present invention to provide an enhanced customer premise equipment (CPE) device.

It is also an aspect of the present invention to provide for the dynamic transmission and display of messages from calling parties to called parties in a telecommunications network.

It is a further aspect of the present invention to provide methods and systems for dynamically providing information to a called party from a calling party utilizing Caller ID services, software and hardware thereof.

It is still a further aspect of the present invention to provide a display screen, including touch screen displays thereof, adapted for the dynamic display of calling party information for a called party.

The above and other aspects of the invention can be achieved as will now be briefly described. Methods and systems in a telecommunications network for dynamically providing calling party information to a called party from a calling party are disclosed herein. A transfer of calling party information can be initiated from the calling party to the called party utilizing a caller identification mechanism in communication with one or more customer premise equipment devices associated with the telecommunications network. Thereafter, the calling party information can be dynamically displayed for the called party via the caller identification mechanism on a display screen of the customer premise equipment device, thereby permitting the called party to take action regarding the calling party information independent of prior or current telecommunications activities. The calling party information can be stored in a memory location for later retrieval by the called party if the called party does not immediately respond to the transfer of calling party information from the calling party to the called party.

The calling party information can also be retrieved from the memory location of the customer premise equipment device, in response to a user input by the called party. Additionally, the calling party information can be encoded prior to or during the transfer of calling party information from the calling party to the called party. The called party can then decode the calling party information, in response to a user input. If the calling party information to be transferred from the calling party to the called party comprises voice data, such information can be converted from voice information to text information and thereafter dynamically displayed as text information on the display screen of the customer premise equipment device. Additionally a symbol can be associated with the calling party information such that the symbol can be displayed on the display screen of the customer premise equipment device. Such a display screen can be configured as an interactive touch screen display device. The called party can then retrieve the calling party information in response to pressing the symbol displayed on the interactive touch screen display device.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE DRAWINGS

The particular values and configurations discussed in these non-limiting examples can be varied and are cited merely to illustrate an embodiment of the present invention and are not intended to limit the scope of the invention.

The invention described herein permits a calling party to leave a message with a called party if the called party is busy with an existing telephone call or telecommunications transaction, or if the called party simply does not answer the call. In general, packet-based telephony, as well as digital services, can enable the communication of data to customer premise equipment (CPE) during a phone conservation or telecommunications transaction. The invention described herein can be utilized to implement a caller information display service that utilizes caller-id capabilities (e.g., a caller identification mechanism) by enabling the calling party to send additional calling party information (e.g., a message) for display on a display screen of a called CPE. Calling party information generally comprises information such as text messages, voice messages, symbols and so forth, which can be dynamically displayed on a display screen of a called party CPE.

Based on the type of end-point utilized by each participant (i.e., calling party and/or called party), the name, location and other information associated with the originator (i.e., the calling party) can be retrieved, captured, communicated and displayed on the display screen of calling party CPE. In addition, the calling party can send other calling party information (e.g., a question or important business results) for communication to the called party while the called party is occupied with a telephone conversation with the calling party or with another party. The present invention thus enables the called party to decide how to take action regarding the calling party information independently of any previous or current activity. Note that the term "called party" can refer to a CPE device and/or a CPE user, while the term "calling party" can refer to a transmitting device such a computer, telephone, wireless communication device and/or a user of such a device.

Figure 1:
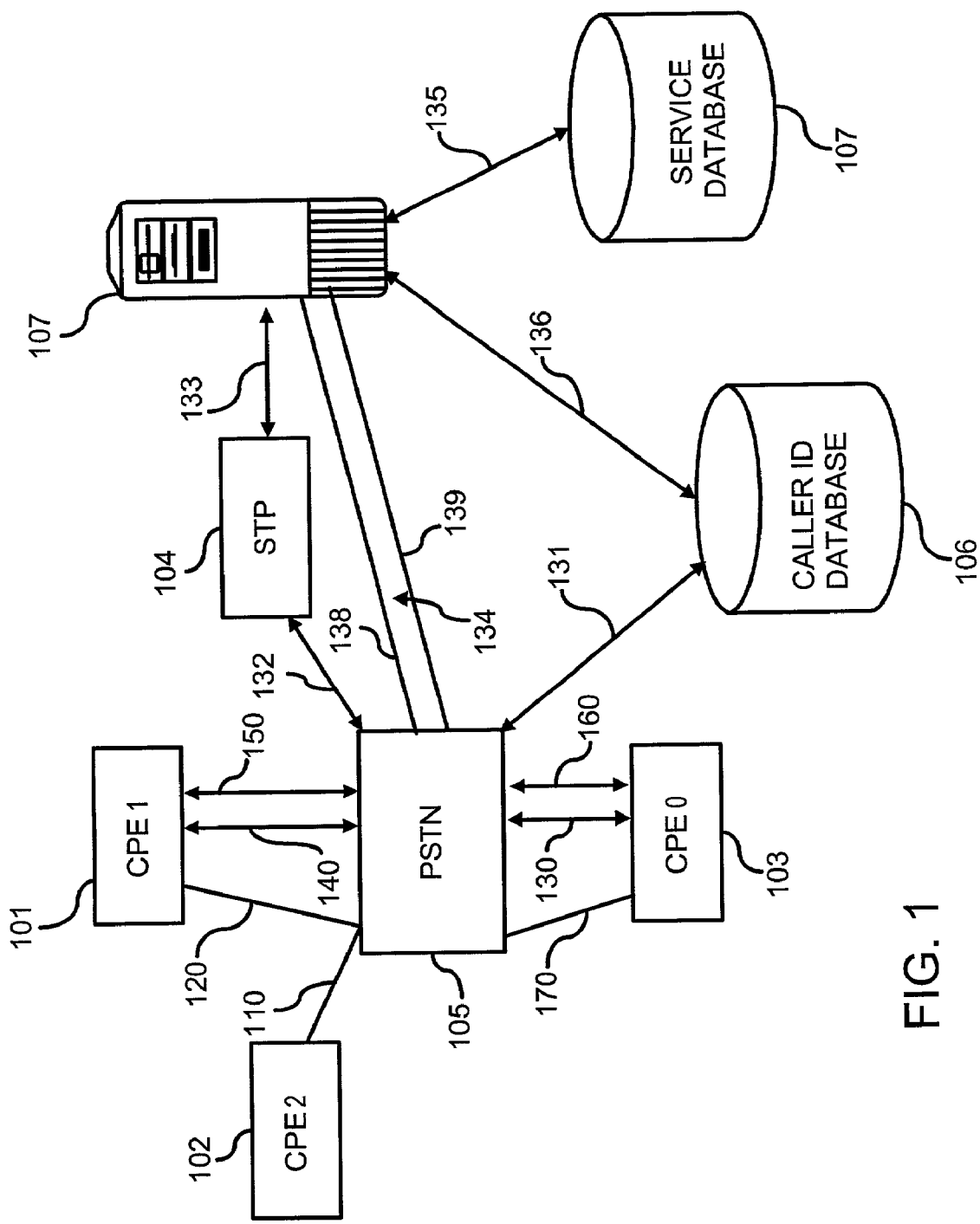
FIG. 1 illustrates a schematic diagram illustrating a plurality of Customer Premise Equipment (CPE) devices in association with a Public Switched Telephone Network (PSTN) and other telecommunications devices in accordance with a preferred embodiment of the present invention.

FIG. 1 illustrates a schematic diagram 100 illustrating a plurality of customer premise equipment (CPE) devices 101, 102 and 103 in association with a Public Switched Telephone Network (PSTN) 105 and other telecommunications devices in accordance with a preferred embodiment of the present invention. CPE devices 101, 102 and 103, which are respectively labeled CPE 1, CPE 2, and CPE 0 in FIG. 1 can communicate with PSTN 105. CPE device 101 communicates with PSTN 105 via communication lines 120, 140 and 150. CPE 102 communicates with PSTN 105 via communication line 110, which also can be connected to communication line 120, thereby permitting CPE 101 and CPE 102 to communicate with one another.

Additionally, CPE 103 can communicate with PSTN 105 via communications lines 130 and 160, and also utilizing communications line 170. PSTN 105 further can communicate with a Caller ID Database 106, which can be associated with a caller identification mechanism (i.e. a Caller ID service). A typical Caller ID service provides the telephone number and household name information of a calling party to the called party before the call is answered. Based on a display of the Caller ID information, the called party may decide not to answer the incoming call. Basic Caller ID information can be transmitted from the local telephone company to the called party while the called party's phone is in a hung-up or on-hook state, between the first and second rings.

Caller ID Database 106 can further communicate with a display server 107, which in turn can communicate with a service database 135. Display server 107 generally manages and controls the display of calling party information on display screens associated with CPE 101, 102, and 103. A communications channel 134 can be present between display server 107 and PSTN 105. Communications lines 138 and 134 form the communications channel 134. Additionally, a communications line 132 can be available between PSTN 105 and a signaling transfer point (STP) 104. which permits data to be transferred between STP 104 and PSTN 105. Also, a communications line 133 can be available between STP 104 and display server 107, which permits data to be transferred between STP 104 and display server 107.

Figure 2:
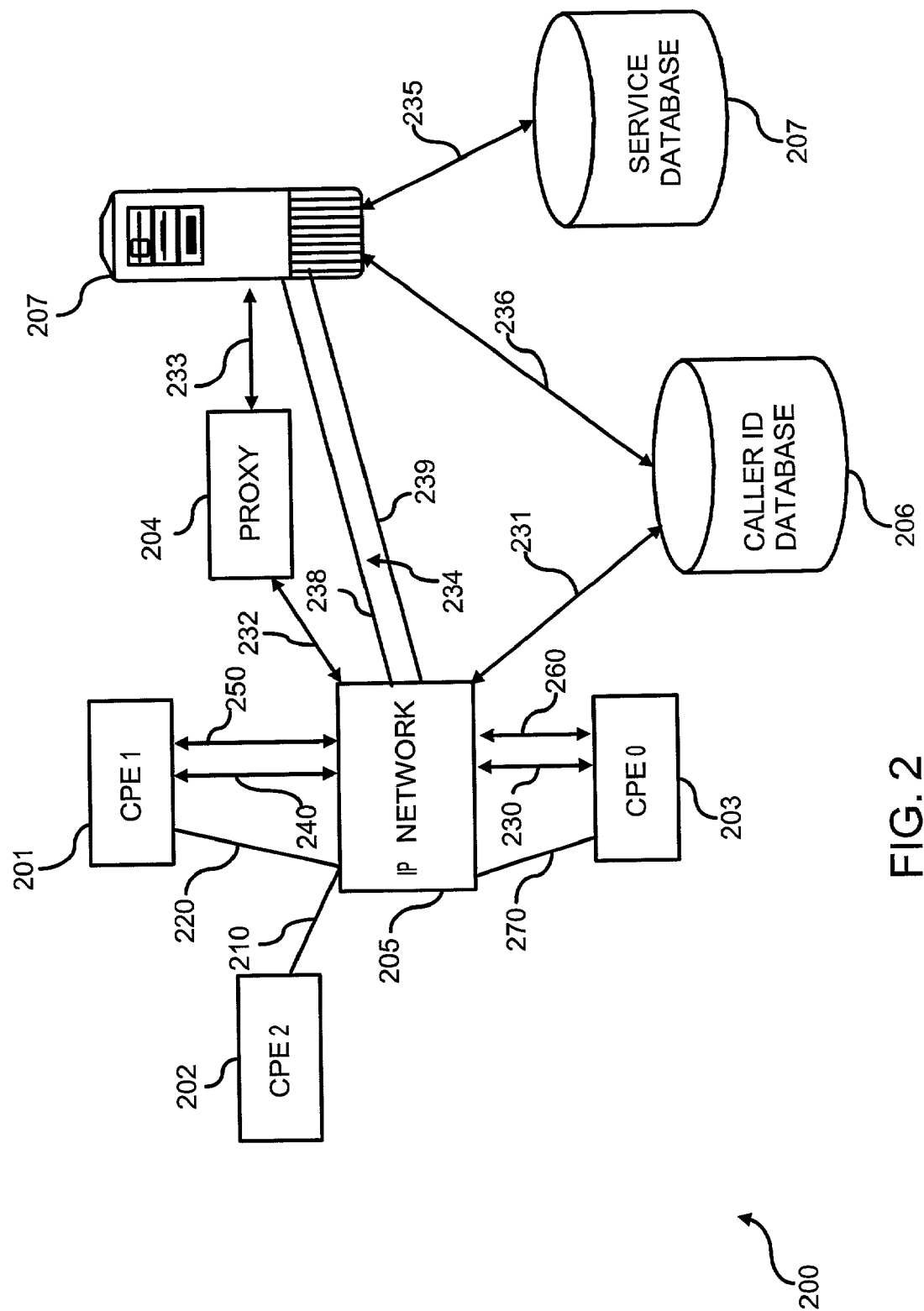
FIG. 2 depicts a schematic diagram illustrating a plurality of Customer Premise Equipment (CPE) devices in association with an IP Network and other telecommunications devices in accordance with an alternative embodiment of the present invention.

FIG. 2 depicts a schematic diagram 200 illustrating a plurality of Customer Premise Equipment (CPE) devices 201, 202, and 203 in association with an IP Network 205 and other telecommunications devices in accordance with an alternative embodiment of the present invention. Note that CPE devices 201, 202, and 203 are respectively labeled CPE 1, CPE 2 and CPE 0 in FIG. 2. CPE device 201 generally communicates with an IP Network 205 via communications lines 240 and 250, and also utilizing communications line 220. CPE 202 communicates with IP Network 205 via communications line 210. Communications line 220 is also generally connected to communications line 210.

Additionally, CPE 203 can communicate with IP Network 205 via communications lines 230, 260 and 270. Further, IP Network 205 can communicate with a Caller ID Database 206 via a communications line 231. Note that Caller ID Database 206 can be associated with a caller identification mechanism. Caller ID Database 206 also communicates with a display server 207 utilizing a communications line 236. A service database 207 communicates with display server 207 over a communications line 235. Data can be transmitted to and from IP Network 205 to display server 207 over a communications channel 234 that can be formed by communications lines 238 and 239. Data can also be transmitted between a proxy 204 and a display server 207 over a communications line 233. Additionally, data can be transmitted between proxy 204 and IP network 205 over a communications line 232.

Figure 3:
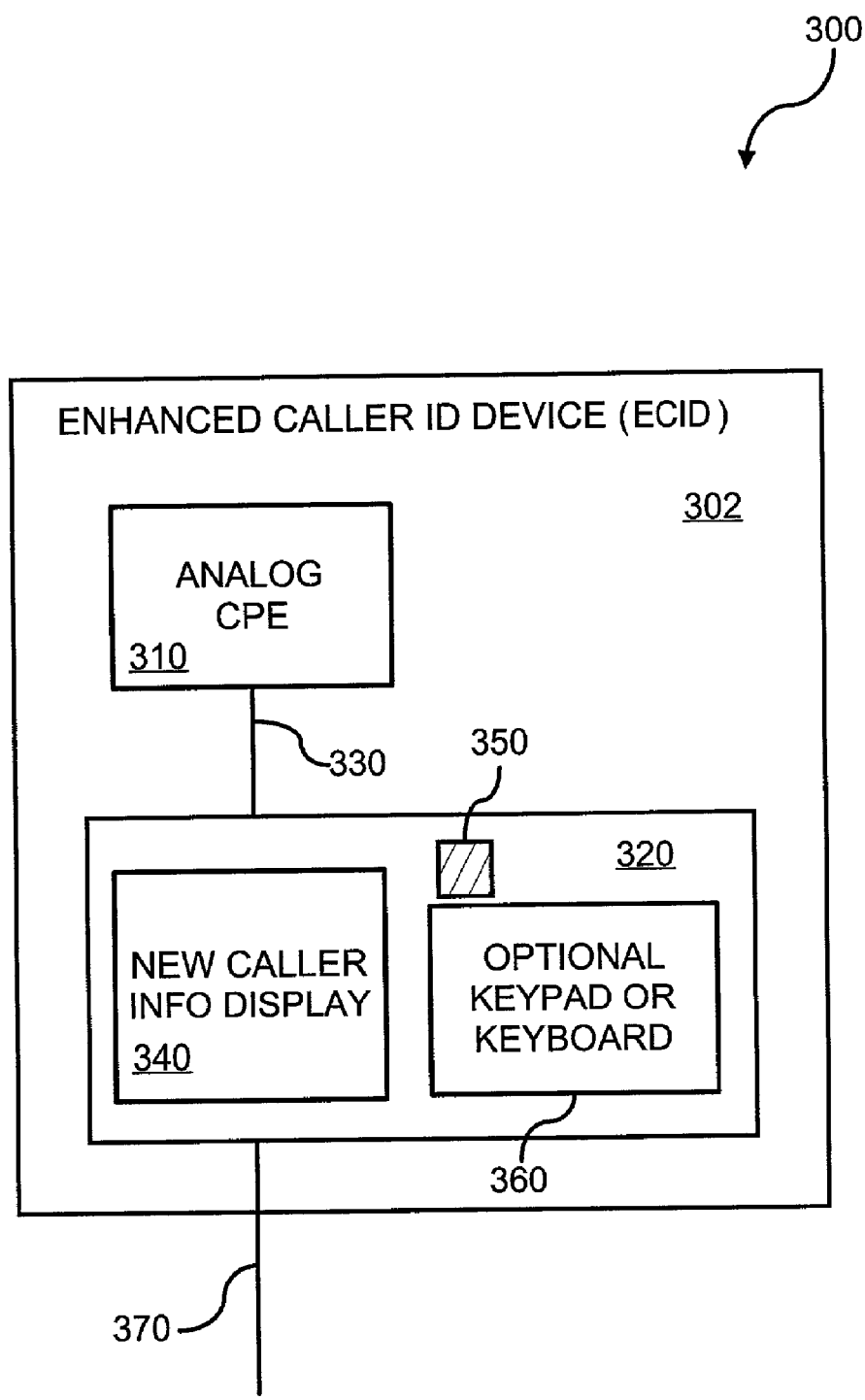
FIG. 3 illustrates a block diagram illustrating an Enhanced Caller ID Device (ECID), which can be implemented in accordance with preferred or alternative embodiments of the present invention.

FIG. 3 illustrates a block diagram 300 illustrating an Enhanced Caller ID Device (ECID) 302, which can be implemented in accordance with preferred or alternative embodiments of the present invention. ECID 302 represents one possible customer premise equipment (CPE) device that can be implemented in accordance with the method and system disclosed herein. ECID 302 generally comprises an analog CPE 310 which can communicate with a combined display/input unit 320 utilizing a phone line 330 or another type of communications line (e.g., wireless and/or wireline). Display/input unit 320 comprises a caller information display 340 (i.e., a display screen) and an optional keypad or keyboard 360. A plurality of buttons 320 (i.e., represented by a single button 320) can also be associated with display/input input 320. Display/input unit 320 can additionally be configured simply as a touch screen display unit, which permits a user to interactively take action with respect to information presented to the user on such touch screen display. Additionally a phone line 370 can transfer data to and from display/input unit 320.

Figure 4:
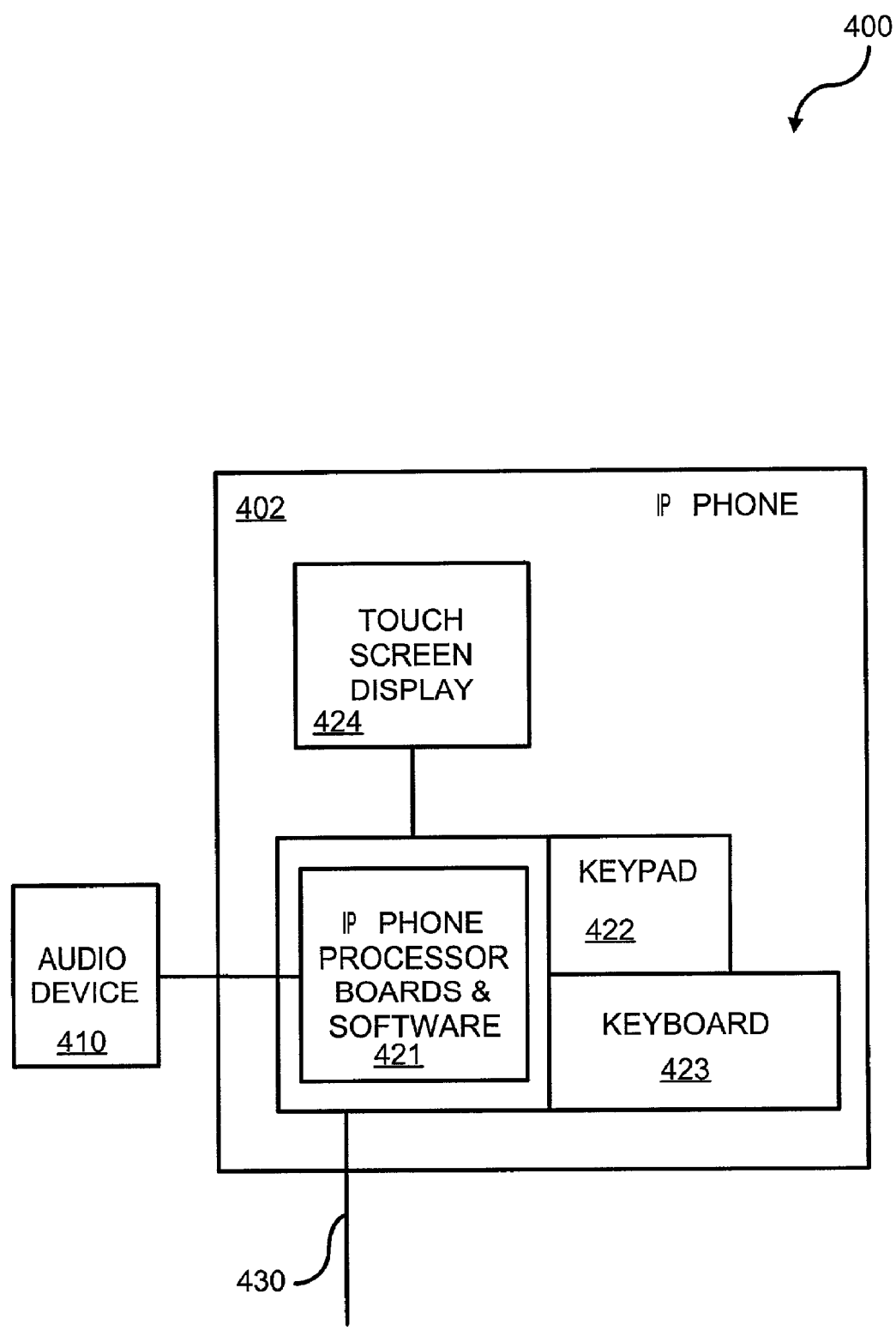
FIG. 4 depicts a block diagram illustrating an IP phone, which can be implemented in accordance with preferred or alternative embodiments of the present invention.

FIG. 4 depicts a block diagram 400 illustrating an IP phone 402, which can be implemented in accordance with preferred or alternative embodiments of the present invention. IP phone 402 generally includes a touch screen display 424, which can be in communication with a processor 421, which generally comprises IP phone processor boards and associated software (i.e., modules). Processor 421 can be associated with a keypad 422 and a keyboard 423 which each permit a user to enter data. Additionally, an audio device 410 communicates with processor 421.

Figure 5:
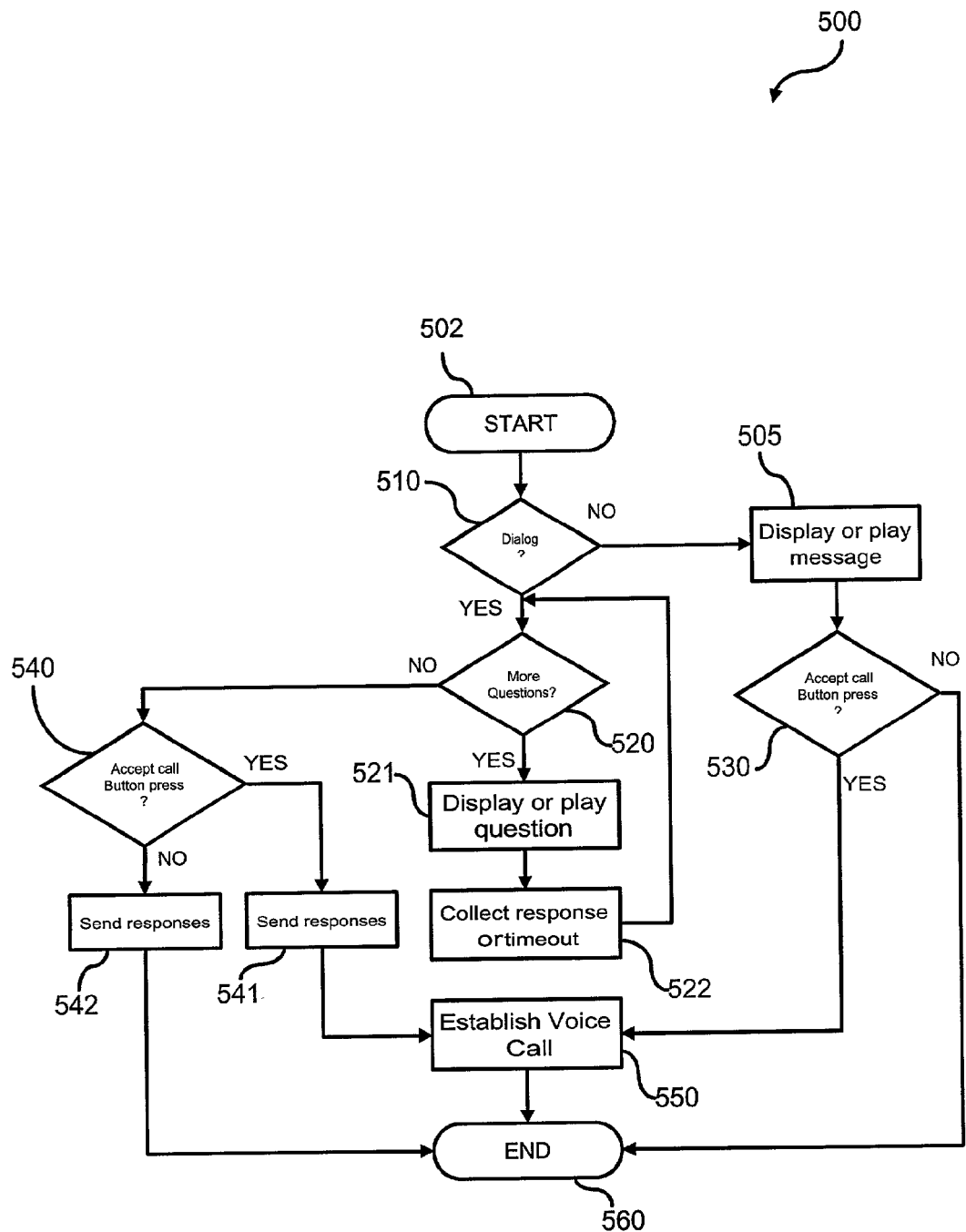
FIG. 5 illustrates a high-level flow chart of operations illustrating logical operational steps, which can be implemented in accordance with preferred or alternative embodiments of the present invention.

FIG. 5 illustrates a high-level flow chart 500 of operations illustrating logical operational steps, which can be implemented in accordance with preferred or alternative embodiments of the present invention. A process can be initiated, as indicated at block 502 and thereafter, as illustrated at block 510, a dialog can be presented in which a called party is prompted to answer or respond to particular questions transmitted from the calling party to the called party in the form of text and/or voice information. Such text information and/or associated symbolic information can be displayed on a display screen of the called party CPE.

Alternatively, if the transmitted calling party information comprises voice information, such voice information can be played for the called party via, for example, an audio device such as audio device 410 illustrated in FIG. 4. If the called party does not respond, then as indicate at block 505, a message can be displayed via a display screen or simply played for the called party. As indicated next at block 530, the called party can either accept or decline the message. If the called party declines the message, then the process simply terminates, as indicated thereafter at block 530. If, however, the called party accepts the message by pressing a button (e.g., a button on keypad 422 or keyboard 423 of IP phone 402 of FIG. 4), then a voice call can be established, as illustrated at block 550. Following processing of the operation illustrated at block 550, the process can be then terminated, as indicated at block 560.

Assuming that the dialog illustrated at block 510 continues, then as depicted at block 520, a decision must be made determining if additional questions are incoming. Such questions may simply be small questions displayable as text information for the called party. The questions can also originate as voice information, which can be converted into text information. Alternatively, such questions can originate as text information and can be converted into audible messages, or the questions can originate as voice information and remain in the form of audible voice information. The questions originate from the calling party. If additional questions continue, then as indicated at block 521, one or more questions can be displayed or played for the user. Next, as depicted at block 522, a response can be collected or a timeout can occur.

Thereafter, the operation described at block 520 can be then repeated and so on. If, however, additional questions are not required following processing of the operation illustrated at block 520, then as indicated at block 540, a decision must be made to accept the incoming calling party information by pressing a button. If the button is pressed and the calling party information is accepted, then appropriate responses are sent, as indicated at block 541, and thereafter as illustrated at block 550, a voice call can be established. The process then terminates, as indicated at block 560. If, however, the button is not pressed and the calling party information is not accepted, then as illustrated at block 542, appropriate response are sent, and the entire process can be then terminated as depicted at block 560.

Figure 6:
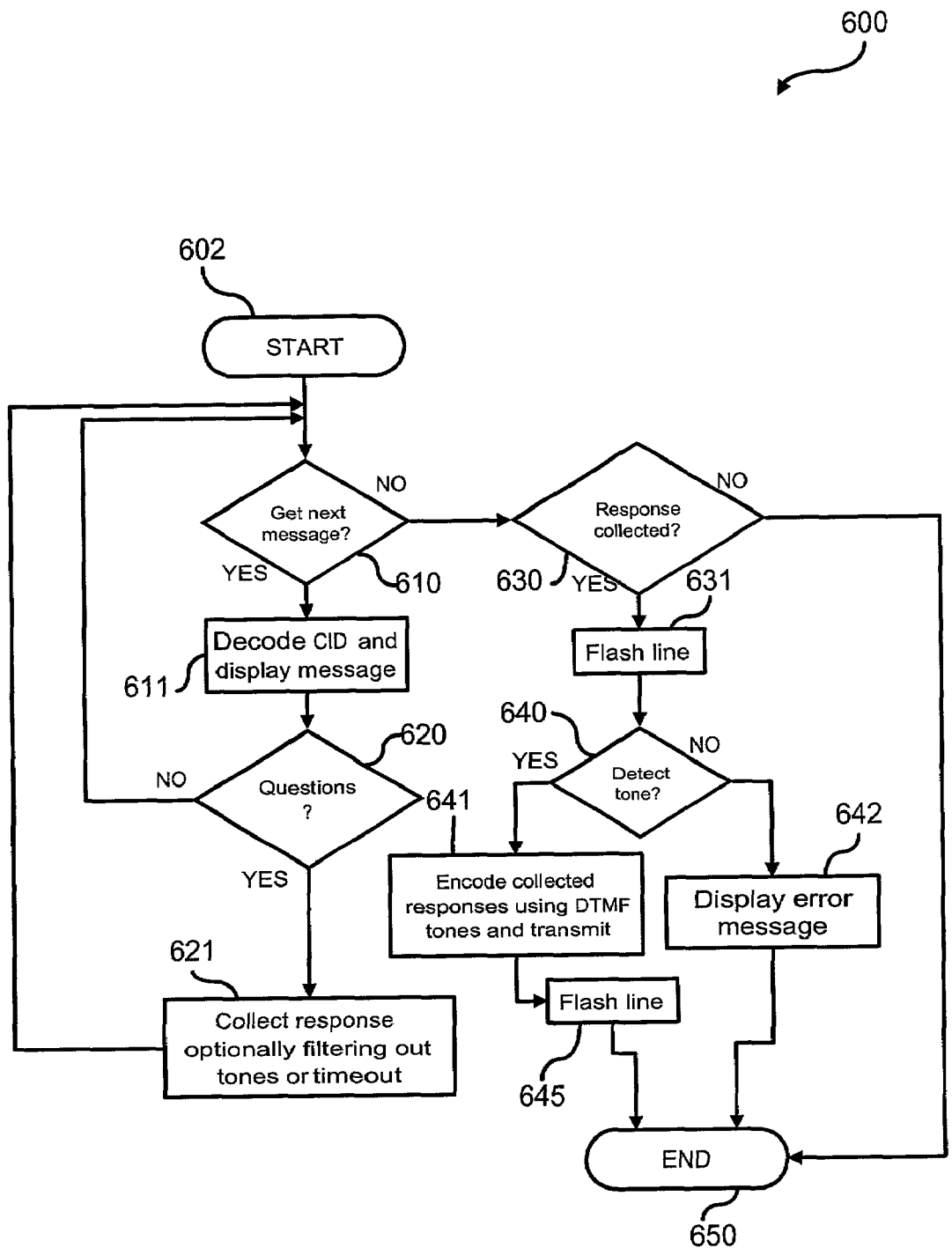
FIG. 6 depicts a high-level flow chart of operations illustrating logical operational steps, which can be implemented in accordance with preferred or alternative embodiments of the present invention.

FIG. 6 depicts a high-level flow chart 600 of operations illustrating logical operational steps, which can be implemented in accordance with preferred or alternative embodiments of the present invention. As illustrated at block 602, the process can be initiated. Thereafter, as depicted at block 610 a decision can be made whether or not to retrieve a text message (i.e., text information). If it is determined to retrieve the text message, then as depicted at block 611, the CID can be decoded and the message displayed. Thereafter, as illustrated at block 620, a determination can be made whether or not additional questions in the form of text information are forthcoming. If so, then as illustrated at block 621, one or more responses are collected and tones thereof are optionally filtered out or a time out occurs. If additional questions are not forthcoming, then the operation repeated at 610 can be repeated and so on. If a text message is not captured, as illustrated at block 610, then a determination can be made whether or not a response is collected, as depicted at block 630. If a response is collected, then as indicated at block 631, a flash line operation (i.e., flash hook operation) can then be processed.

If a response is not collected, as depicted at block 630, then the entire process simply terminates as indicated thereafter at block 650. Following processing of the operation described at block 631 (i.e., the "flash line" or "flash hook" operation), a determination can be performed regarding tone detection, as described at block 640. If a tone is detected, then as illustrated at block 641, collected responses are encoded utilizing DTMF tones and transmitted thereof.

Note that a common signaling method employed in telecommunications networks can be dual-tone multi-frequency ("DTMF") signaling. In this signaling scheme, pairs of tones are utilized to signal the digits 0 through 9, pound ("#"), star ("*") and the digits "A", "B", "C", and "D". For each pair of tones, one of the tones can be selected from a low group of four frequencies and the other tone can be selected from a high group of four frequencies. The correct detection of a signal requires both a valid tone pair and a correct timing interval. Other signals, such as an "alerting signal," use additional tone pairs, and can be utilized for special features such as caller identity delivery on call waiting ("CIDCW"). DTMF signaling can be utilized both to set up a call and to control certain features such as call forwarding and conference calling.

Another flash line operation then occurs, as indicated at block 645, and the entire process then terminates as illustrated thereafter at block 650. If, however, a tone is not detected, then following processing of the operation described at block 640, an error message can then be displayed, as indicated at block 642. This error message can be displayed on a display screen (e.g., touch screen display 424 of FIG. 4 or new caller information display 340 of FIG. 3) of a CPE. The process then terminates, as indicated at block 650.

Those skilled in the art can appreciate that the present invention can be implemented as a program product (i.e., computer program product) composed of one or more modules. The term "module" as utilized herein thus generally refers to a software module, but can also refer to hardware equipment (i.e., physical modules), which may or may not operate independently of specific software. In the computer programming and telecommunications arts, a module can be implemented as a collection of routines and data structures that performs particular tasks or implements a particular abstract data type. Modules generally are composed of two parts. First, a software module can list the constants, data types, variable, routines, and so forth that can be accessed by other modules or routines. Second, a software module can be configured as an implementation, which can be private (i.e., accessible only to the module), and which contains the source code that actually implements the routines or subroutines upon which the module is based. Thus, when referring to a "module" herein, the present inventors are referring so such software modules or implementations thereof.

It can further be appreciated by those skilled in the art that the methods and systems described herein, including, for example, the CPE illustrated herein can be implemented as a series of modules either function alone or in concert with physical electronic and computer hardware devices. Such modules can be utilized separately and/or together locally and/or remotely to form a program product thereof that can be implemented through signal-bearing media, including transmission media and recordable media. The present invention can be implemented as a program product composed of a plurality of such modules, which can be interactively displayed for a user on a display screen of a data-processing system (e.g., computer). Such interactivity can be provided by a graphical user interface (GUI), which is well known in the art, including Internet browser applications thereof. The logical operations described in FIGS. 5 and 6, for example, can be implemented as a one or more modules.

The present invention can be implemented as a system for dynamically providing calling party information to a called party from a calling party over a telecommunications network. Such a system can include a caller identification mechanism in communication with one or more CPE devices associated with the telecommunications network, wherein a transfer of calling party information from the calling party to the called party can be initiated utilizing the caller identification mechanism. Such a system can also include a display module for displaying the calling party information for the called party on a display screen of the CPE device, thereby permitting the called party to take action regarding the calling party information independent of prior or current telecommunications activities. Additionally, such a system can utilize a memory location for storing the calling party information, wherein the called party can retrieve the calling party information from the memory if the called party does not immediately respond to the transfer of calling party information from the calling party to the called party.

The CPE device can be implemented as a standard CPE device or another type of CPE device, such as a wireless communications device (e.g., a web phone), which enables messages to be typed-in or encoded and transmitted. Such a system can be integrated with existing messaging systems to enable voice recognition to capture a text version of a message (i.e., information transmitted from a called party to a calling party), the storage of messages for later access, and the display of a message identifier. The message display formats for the called party CPE can include showing/scrolling a test message or leaving a "note," picture, URL or other symbol on the called party's CPE display to enable faster retrieval of the voice/data message from menu/button selection. An associating module, which is described in further detail below, can be utilized to associated particular symbols with a text or voice message for display on an interactive touch screen display for the called party.

Such a system can also include a capture and storage module for capturing and storing the calling party information in a memory location of the CPE device, in response to a user input by the called party. The calling party information can be retrieved from the memory location of the CPE device, in response to a user input by the called party. Additionally, an encoding module for encoding the calling party information prior to the transfer of calling party information from the calling party to the called party can be utilized in association with a decoding module for decoding the calling party information, in response to a user input by the called party, such that the calling party information is thereafter dynamically displayable for the called party via the caller identification mechanism on the display screen of the CPE device.

Such a system can also include a converting module for converting the calling party information from voice information to text information, if the calling party information initially comprises voice information, such that the text information is dynamically displayable on the display screen of the CPE device, after the calling party information has been transferred from the calling party to the called party via the caller identification mechanism. Additionally, such a system can include an associating module for associating a symbol with the calling party information, and a display module for displaying the symbol on the display screen of the CPE device, wherein the display screen comprises an interactive touch screen display device, such that the called party can be permitted to retrieve the calling party information, in response to pressing the symbol displayed on the interactive touch screen display device.

Additionally, a system for dynamically providing calling party information to a called party from a calling party over a telecommunications network can be configured to include a caller identification mechanism, such as a caller ID database, in association with caller ID services (e.g., ECID services), which communicate with one or more customer premise equipment (e.g., an ECID) associated with the telecommunications network, wherein a transfer of calling party information from the calling party to the called party is initiated utilizing the caller identification mechanism. In this scenario, the telecommunications network can be configured as a combined wireless PSTN and IP network. Additionally, such a system can include one or more information and signaling gateways through which the calling party information can be bridged. Also, a plurality of end points is generally associated with the telecommunications network to dynamically exchange information, including calling party information thereof.

In addition, a display module for displaying the calling party information for the called party on a display screen of the customer premise equipment device can also be implemented in accordance with such a system, thereby permitting the called party to take action regarding the calling party information independent of prior or current telecommunications activities. Thus, such a system can be configured so that the endpoints handle a mixed variety of calling party information types (e.g., analog, digital, wireless with short message service, IP with SIP and HTML, and so forth) and ECID services. Information is generally bridged through the aforementioned information and signaling gateways (i.e., communications gateways). The endpoints dynamically exchange information with associated ECID services. The number of endpoints involved in ECID communications associated with the aforementioned combined PSTN/IP telecommunications network can be, for example, two or more, depending on a desired network implementation.

Finally, such a system can permit the display of participants' names or symbols on the display screen of the customer premise equipment device (e.g., ECID), thereby providing for multi-party dynamic message exchanges. The display module described above thus permits the display of an indication of one or more teleconference participants from among a group of teleconference participants, including one or more calling parties and one or more called parties. An example of a business application of a business application of such a system can be, for example, a broadcast of a meeting reminder or business information to a list of participants, including notices with RSPV and so forth, which are displayable on the ECID display screen.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

We claim:

1. A method in a public switched telephone network for dynamically providing calling party information to a called party from a calling party during a call from the calling party to the called party, wherein the called party is a user of a first customer premise equipment (CPE) device and the calling party is a user of a second CPE device, said method comprising the steps of:
   prompting the calling party for calling party information, wherein the calling party information comprises a message for the user of the first CPE device from the user of the second CPE device;
   receiving said calling party information from said calling party through a text message, voice message, or symbol;
   initiating a transfer of said calling party information, from said calling party to the second customer premise equipment device of said called party through employment of a caller identification mechanism of said public switched telephone network, wherein the caller identification mechanism comprises a type I or type II caller identification mechanism;
   dynamically displaying said calling party information for said called party via said caller identification mechanism on said second customer premise equipment device, thereby permitting said called party to take action regarding said calling party information independent of prior or current public switched telephone activities.

2. The method of claim 1 further comprising the step of:
   storing said calling party information in a memory location for later retrieval by said called party if said called party does not immediately respond to said transfer of calling party information from said calling party to said called party.

3. The method of claim 1 further comprising the steps of:
   capturing and storing said calling party information in a memory location of said at least one customer premise equipment device, in response to a user input by said called party.

4. The method of claim 3 further comprising the step of:
   retrieving said calling party information from said memory location of said at least one customer premise equipment device, in response to a user input by said called party.

5. The method of claim 1 further comprising the steps of:
   encoding said calling party information prior to said transfer of calling party information from said calling party to said called party;
   decoding said calling party information, in response to a user input by said called party; and
   thereafter dynamically displaying said calling party information for said called party via said caller identification mechanism on said display screen of said at least one customer premise equipment device.

6. The method of claim 1 further comprising the step of:
converting said calling party information from voice information to text information, if said calling party information initially comprises voice information; and
thereafter dynamically displaying said text information on said display screen of said at least one customer premise equipment device, after said calling party information has been transferred from said calling party to said called party via said caller identification mechanism in communication with said at least one customer premise equipment device.

7. The method of claim 1 further comprising the steps of:
associating a symbol with said calling party information;
displaying said symbol on said display screen of said at least one customer premise equipment device, wherein said display screen comprises an interactive touch screen display device and;
permitting said called party to retrieve said calling party information, in response to pressing said symbol displayed on said interactive touch screen display device.

8. The method of claim 1 wherein said public switched telephone network comprises an IP network.

9. The method of claim 1 wherein said at least one customer premise equipment device comprises a wireless communications device and said public switched telephone network comprises a wireless communications network.

10. A system for dynamically providing calling party information to a called party from a calling party over a public switched telephone network during a call from the calling party to the called party, wherein the called party is a user of a first customer premise equipment (CPE) device and the calling party is a user of a second CPE device, said system comprising:
a caller identification mechanism in communication with at least one customer premise equipment associated with said public switched telephone network, wherein the user of the second CPE device is prompted for said calling party information, wherein a transfer of said calling party information received from said calling party to said called party is initiated utilizing said caller identification mechanism, wherein the calling party information is received from the calling party as a text message, voice message, or symbol; and
a display module for displaying said calling party information for said called party on a display screen of said at least one customer premise equipment device, thereby permitting said called party to take action regarding said calling party information independent of prior or current telecommunications activities;
wherein the caller identification mechanism comprises a type I or type II caller identification mechanism.

11. The system of claim 10 further comprising:
a memory location for storing said calling party information, wherein said calling party information is retrievable from said memory by said called party if said called party does not immediately respond to said transfer of calling party information from said calling party to said called party.

12. The system of claim 10 further comprising:
a capture and storage module for capturing and storing said calling party information in a memory location of said at least one customer premise equipment device, in response to a user input by said called party.

13. The system of claim 12 wherein said calling party information is retrievable from said memory location of said at least one customer premise equipment device, in response to a user input by said called party.

14. The system of claim 10 further comprising:
encoding module for encoding said calling party information prior to said transfer of calling party information from said calling party to said called party; and
decoding module for decoding said calling party information, in response to a user input by said called party, such that said calling party information is thereafter dynamically displayable for said called party via said caller identification mechanism on said display screen of said at least one customer premise equipment device.

15. The system of claim 10 further comprising:
converting module for converting said calling party information from voice information to text information, if said calling party information initially comprises voice information, such that said text information is thereafter dynamically displayable on said display screen of said at least one customer premise equipment device, after said calling party information has been transferred from said calling party to said called party via said caller identification mechanism.

16. The system of claim 10 further comprising:
associating module for associating a symbol with said calling party information;
display module for displaying said symbol on said display screen of said at least one customer premise equipment device, wherein said display screen comprises an interactive touch screen display device, such that said called party is permitted to retrieve said calling party information, in response to pressing said symbol displayed on said interactive touch screen display device.

17. A system for dynamically providing calling party information to a called party from a calling party over a public switched telephone network during a call from the calling party to the called party, wherein the called party is a user of a first customer premise equipment (CPE) device and the calling art is a user of a second CPE device, said system comprising:
a caller identification mechanism in communication with at least one Enhanced Caller ID Device (ECID) associated with said public switched telephone network, wherein the user of the second CPE device is prompted for said calling party information, wherein a transfer of said calling party information received from said calling party to said called party is initiated utilizing said caller identification mechanism, wherein said public switched telephone network comprises a combined wireless PSTN and IP network, wherein the caller identification mechanism comprises a type I or type II caller identification mechanism, wherein the calling party information is received from the calling party as a text message, voice message, or symbol;
at least one information and signaling gateway associated with said public switched telephone network through which said calling party information is bridged;
a plurality of endpoints associated with said public switched telephone network, wherein said calling party information is dynamically exchanged; and
a display module for displaying said calling party information for said called party on a display screen of said at least one ECID, thereby permitting said called party to take action regarding said calling party information independent of prior or current telecommunications activities.

18. The system of claim 17 wherein said caller identification mechanism comprises a caller ID database and an associated caller ID service, including a service database thereof.

19. The system of claim 17 wherein said display module permits a display of an indication of at least one teleconference participant from among a plurality of teleconference participants, including at least one calling party and at least one called party thereof.

20. The method of claim 1, wherein said calling party information comprises first information from said calling party, the method further comprising the steps of:
- receiving a response to said first calling party information from said called party;
- transferring the response from said called party to said calling party through employment of said caller identification mechanism;
- receiving second calling party information from said calling party after the step of initiating the transfer of said response;
- initiating a transfer of said second information from said calling party to said customer premise equipment of said called party through employment of said caller identification mechanism; and
- dynamically presenting said second calling party information on said customer premise equipment device.

21. The method of claim 20, wherein the step of receiving the second information from said calling party after the step of initiating the transfer of said response comprises the step of:
- receiving one or more of voice, data, and/or text information from said calling party.

22. The system of claim 10, wherein said caller identification mechanism supports an encoding of said response through employment of one or more DTMF tones.

23. The system of claim 22, further comprising:
- an enhanced caller ID device (ECID) that encodes said response through employment of the one or more DTMF tones.

24. The system of claim 17, wherein one Enhanced Caller ID Device of the at least one Enhanced Caller ID Device displays the calling party information for the called party.

25. The method of claim 1, wherein the step of initiating the transfer of said calling party information from said calling party to the customer premise equipment device of said called party through employment of the caller identification mechanism of said public switched telephone network comprises the step of:
- transferring said calling party information to the customer premise equipment device of said called party through employment of a frequency shift keying (FSK) implementation of the caller identification mechanism of said public switched telephone network.

* * * * *